United States Patent
Zimmer et al.

(10) Patent No.: US 10,801,563 B2
(45) Date of Patent: Oct. 13, 2020

(54) BRAKING AND/OR CLAMPING DEVICE HAVING AN ACTUATION ASSEMBLY AND A SHAFT-COUPLING ASSEMBLY II

(71) Applicants: Martin Zimmer, Rheinau (DE); Günther Zimmer, Rheinau (DE)

(72) Inventors: Martin Zimmer, Rheinau (DE); Günther Zimmer, Rheinau (DE)

( * ) Notice: Subject to any disclaimer, the term of this patent is extended or adjusted under 35 U.S.C. 154(b) by 69 days.

(21) Appl. No.: 16/324,561

(22) PCT Filed: Aug. 8, 2017

(86) PCT No.: PCT/DE2017/000249
§ 371 (c)(1),
(2) Date: Feb. 10, 2019

(87) PCT Pub. No.: WO2018/028731
PCT Pub. Date: Feb. 15, 2018

(65) Prior Publication Data
US 2019/0186565 A1      Jun. 20, 2019

(30) Foreign Application Priority Data

Aug. 9, 2016   (DE) .................... 10 2016 009 581

(51) Int. Cl.
| | |
|---|---|
| *F16D 55/224* | (2006.01) |
| *F16D 59/02* | (2006.01) |
| *F16D 55/12* | (2006.01) |
| *F16D 65/18* | (2006.01) |

(Continued)

(52) U.S. Cl.
CPC ......... *F16D 55/2245* (2013.01); *F16D 55/12* (2013.01); *F16D 59/02* (2013.01);
(Continued)

(58) Field of Classification Search
CPC ...... F16D 53/00; F16D 55/12; F16D 55/2245; F16D 59/02; F16D 65/18;
(Continued)

(56) References Cited

U.S. PATENT DOCUMENTS 3,651,909 A * 3/1972 Zautaszwili .......... F16D 25/044
                                                              192/85.06
4,335,808 A * 6/1982 Johnson .................. F16D 55/10
                                                              188/72.3

(Continued)

FOREIGN PATENT DOCUMENTS

| DE | 2106009 A1 | 8/1972 |
|---|---|---|
| DE | 10302225 A1 | 7/2004 |

(Continued)

*Primary Examiner* — Robert A. Siconolfi
*Assistant Examiner* — San M Aung
(74) *Attorney, Agent, or Firm* — Smartpat PLC (57) ABSTRACT

The invention relates to a braking and/or clamping device for a shaft guided in relation to a main body, comprising an actuation assembly and a shaft-coupling assembly. In this case, the actuation assembly comprises a split housing which has two bending plates which are elastically deformable in some regions. The bending plates each have tong jaws with friction surfaces, the respective surface normal of which are directed inwards. A sealed pressure chamber, which can be filled with a pressure medium, lies between the bending plates. Parts of a shaft-coupling assembly project between the clamping zones, said parts establishing the linking for the braked or clamped shaft. When the pressure in the pressure chamber is relieved, the frictional surfaces of the actuation assembly can be applied to the frictional surfaces of the shaft-coupling assembly, thereby producing the braking and/or clamping force. According to the present invention, a braking and/or clamping device is developed, which has a reduced structural width even with a large diameter, consists of few components and also functions in a simple, secure and maintenance-free manner.

10 Claims, 3 Drawing Sheets

(51) Int. Cl.
*F16D 121/12* (2012.01)
*F16D 55/00* (2006.01)
*F16D 125/14* (2012.01)
*F16D 125/64* (2012.01)

(52) U.S. Cl.
CPC ...... *F16D 65/18* (2013.01); *F16D 2055/0058* (2013.01); *F16D 2121/12* (2013.01); *F16D 2125/14* (2013.01); *F16D 2125/64* (2013.01); *F16D 2200/0021* (2013.01)

(58) Field of Classification Search
CPC ..... F16D 2200/0021; F16D 2055/0058; F16D 2121/12; F16D 2121/32; F16D 2125/14; F16D 2125/64; F16D 2065/024
USPC ... 188/72.3, 72.7, 71.1, 161, 170, 259, 71.5, 188/71.8, 43, 366; 192/107 M, 107 R, 192/70.14, 70.15, 85.21
See application file for complete search history.

(56) References Cited

U.S. PATENT DOCUMENTS

| | | | |
|---|---|---|---|
| 6,629,584 | B1 | 10/2003 | Müller |
| 2008/0000346 | A1 | 1/2008 | Hofmann |
| 2009/0101452 | A1* | 4/2009 | Zimmer ................. F16D 53/00 188/71.1 |
| 2014/0147280 | A1* | 5/2014 | Kowatsch ............... F16D 55/02 416/169 R |

FOREIGN PATENT DOCUMENTS

| | | |
|---|---|---|
| DE | 102009022206 | 12/2010 |
| DE | 102008020518 | 5/2012 |
| DE | 102004010987 | 8/2013 |
| DE | 102012023831 A1 | 6/2014 |
| EP | 1228321 B1 | 8/2006 |

* cited by examiner

BRAKING AND/OR CLAMPING DEVICE HAVING AN ACTUATION ASSEMBLY AND A SHAFT-COUPLING ASSEMBLY II

TECHNICAL FIELD

The invention relates to a braking and/or clamping device for a shaft guided in relation to a main body, comprising an actuation assembly and a shaft-coupling assembly.

BACKGROUND

A braking and/or clamping device for shafts is known from DE 10 2008 020 518 in which, for example, ten sliding-wedge-type transmissions acting on friction locks are arranged around the shaft. The sliding wedges are adjusted by means of pneumatic cylinders to press the individual brake shoes against the shaft. This construction has a high space requirement and acts directly on the shaft.

EP 1 228 321 B1 describes a clamping and/or braking device for clamping and/or braking a shaft. The shaft is surrounded by a main body in this case. The main body comprises an outer ring, an inner ring, and two flat rim-like walls arranged between the rings. The rings and the walls surround a pressure chamber. The inner ring is clamped radially on the shaft when the pressure chamber is vented. If the pressure chamber is charged with a pressure medium, the walls deform, whereby the inner ring releases the shaft.

The present invention is based on the problem of developing such a braking and/or clamping device, which has a small structural width even with a large diameter, consists of few components, and also functions in a simple, secure and maintenance-free manner.

SUMMARY

This problem is solved with the features of the main claim. In this case, the actuation assembly comprises a gap housing, which has a mounting zone and a bending zone. The bending zone is elastically deformable in some regions with two bending plates separated by a gap. The bending plates each comprise, in two opposing clamping zones, tong jaws having friction surfaces, the respective surface normals of which are directed inwards. A sealed pressure chamber, which can be filled with a pressure medium for elastically pushing apart the friction surfaces, lies between the bending plates.

The shaft-coupling assembly comprises a clutch region which has two friction surfaces spaced apart from each other, the respective surface normals of which point outward. The shaft-coupling assembly comprises a shaft-coupling region. The shaft-coupling region is arranged either directly or indirectly via a clamping mechanism on the clutch region. When the pressure in the pressure chamber is relieved, the friction surfaces of the actuation assembly can be applied to the friction surfaces of the shaft-coupling assembly, thereby producing a braking and/or clamping force.

The subject of the present disclosure is a braking and/or clamping device for shafts made of at least two parts. One part is assembled as an adapter on the shaft and clamped or screwed thereto in order to rotate therewith. It has, for example, a radially protruding clamping flange. The other part is a type of tongs, which are attached to a fixed machine part, for example one supporting the aforementioned shaft. The tongs have, for example, annular tong jaws with which they can loosely enclose the end faces of the shaft-side flange or can grip them in a rotationally fixed manner. The device parts that brake or clamp the shaft do not butt against the outer wall of the shaft, that is, the working joint of the braking and/or clamping device is identical to the wall of the shaft itself.

The annular tong jaws of the device can be described simplified as two disk springs, the two inner edges of which face each other, while the larger diameter outer edges lie far apart from each other in the axial direction. The clamping flange is inserted between the inner edges, which form a clamping zone. Now, if the outer edges, which represent the mounting zone, are moved towards each other in the axial direction, the smaller diameter inner edges clamp the clamping flange for holding spring-loaded like tongs. During production, the disk springs are formed to each other in the region of the outer edges, so that the distance between the outer edges can no longer be changed. To release the clamping flange again, the disk springs are pressed apart with oil pressure. The inner edges detach from the clamping flange. The disk springs previously biased for clamping are thus stretched or deformed even more to release.

Alternatively, the device can also be designed so that the clamping flange is mounted in the bore of a rotating ring, while the fixedly mounted tongs spatially engage within the rotating ring of its inwardly cantilevered clamping flange.

Further details of the invention become apparent from the dependent claims and the following description of at least one schematically illustrated embodiment.

DETAILED DESCRIPTION

Figure 1:
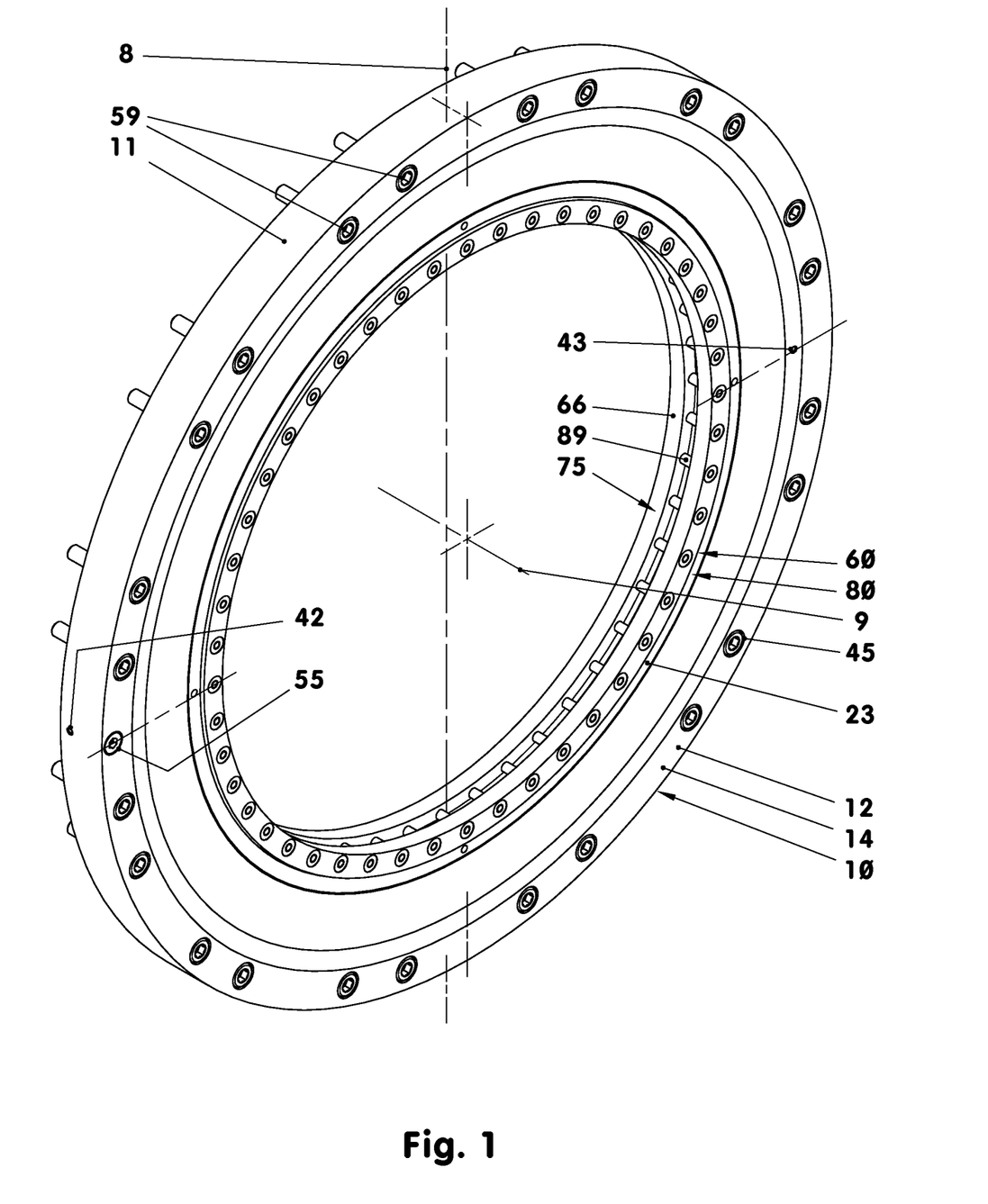
FIG. 1 is a perspective view of a braking and/or clamping device having a shaft-hub connection based on a double radial clamping flange.
Figure 2:
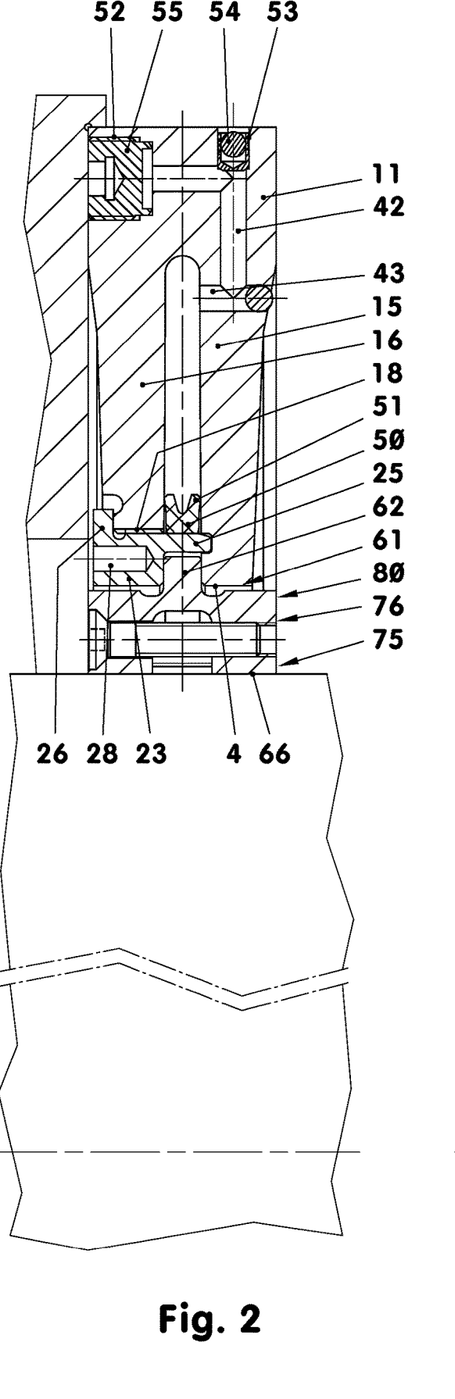
FIG. 2 is a partial longitudinal section of FIG. 1.
Figure 3:
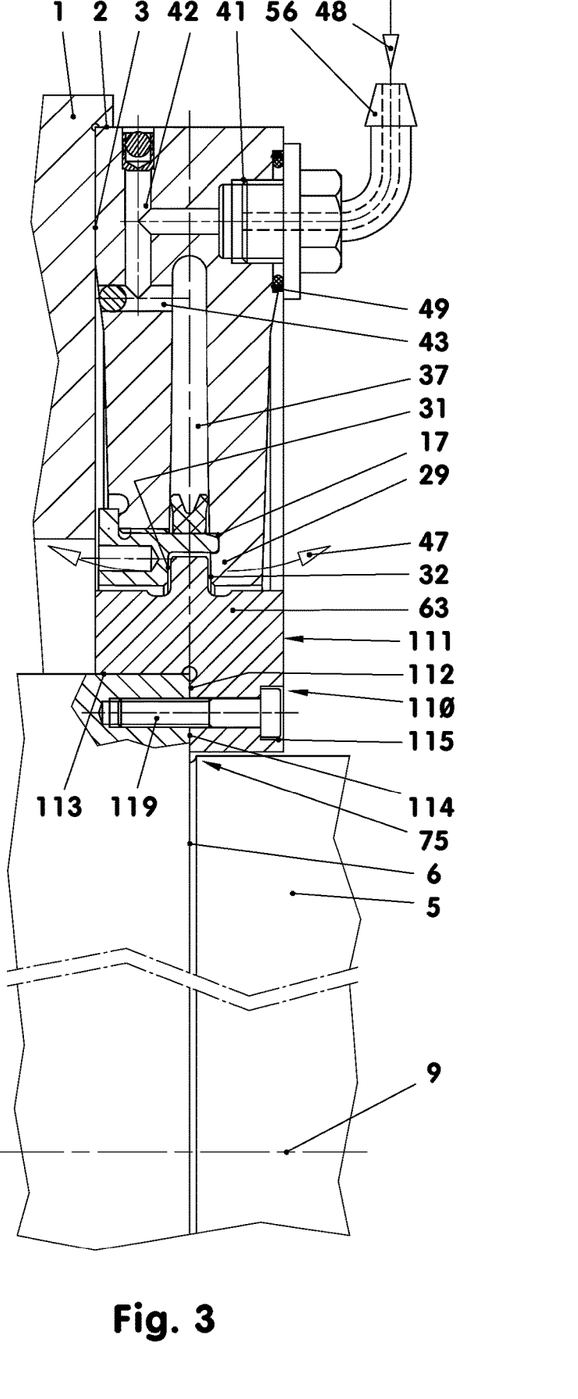
FIG. 3 is a partial longitudinal section of FIG. 1, but with uneven and/or flexible guide element.

FIG. 1 shows the braking and/or clamping device without the load-bearing machine-side main body (1), see FIG. 2 or 3, and without the shaft (5) to be braked and/or firmly clamped. The outer actuation assembly (10) has a back side, via which it is screwed on the main body (1) by fastening screws (59). The actuation assembly (10) surrounds a shaft-coupling assembly (60) which adapts a clamping flange (62) to the shaft (5). The actuation assembly (10) has an elastic gap housing (11) that with its tong jaws (23, 29), when braking or clamping, abuts against the clamping flange (62). Together with a sealing ring (50), the gap housing (11) encloses a pressure chamber (37, 38). If the latter is pressurized by a gaseous, liquid or gel-like pressure medium, the tong-like clasping of the clamping flange (62) is released.

The pressure chamber (37, 38) has a volume that is less than 12.5 percent of the envelope volume of the actuation assembly (10). The envelope volume of the variant illustrated in the figures corresponds to a given volume of a tubular body, that has the device width as a tube length, the outer device diameter as an outer diameter, and the minimum inner diameter of the bending plate (15) as an inner diameter.

The actuation assembly (10) comprises an annular or tubular gap housing (11) which encloses the, for example, narrow-gap annular pressure chamber (37). The gap housing (11) is, in the undeformed state, substantially a flat disk having an inner diameter of, for example, about 280 mm and an outer diameter of, for example, 388 mm. The maximum thickness of the disk is, for example, 22 mm. The gap housing (11) is made of tempered steel, for example, 42CrMoS4. It is divided into three regions (13, 21, 26) which adjoin one another in the radial direction. The clamping zones (22) are the inner region. It is followed by the bending zone (21), which opens into the outer region, the mounting zone (13).

The gap housing (11) is milled out to produce the gap space (37, 38) from its central bore (4), for example, with a side milling cutter centrally between the end faces. The milled, for example, 38.7 mm deep groove, has a gap width of, for example, 4 mm. The channel-shaped groove base has a radius of 2 mm here.

The mounting zone (13), in which the gap (37, 38) does not protrude or only protrudes 1 to 10 mm, has, for example, on both sides an at least in some regions planar end face, over which the gap housing (11) can be applied on a mounting surface (3) of the main body (1). It comprises, on a diameter of, for example, 370 mm, a bore group consisting of two countersunk bores or double countersunk bores (45) every 30 degrees. These through holes each have a countersink according to DIN 974 at one or both ends. The countersunk bores or double countersunk bores (45) of the individual bore group are arranged offset from one another by 10 degrees. The inlet threaded bore or the sealing plug threaded bore (41) is located between each two bore groups. The bores (41) lie diametrically opposite, for example, on different diameters and are also arranged on different end faces of the mounting zone (13).

According to FIG. 3, at least one inlet threaded bore (41) is located on the front side (12) of the actuation assembly (10) in the mounting zone (13). The M10 fine thread used here receives, according to FIG. 3—only by way of example—a hydraulic adapter (56). Alternatively, the inlet threaded bore (41) with its cutting ring (49) and the sealing ring lying against it can also be arranged on the rear side of the actuation assembly (10), see FIG. 1. In this case, the inlet threaded bore (41)—not shown in FIG. 1—is arranged opposite a pressure medium-carrying bore in the main body (1). The cutting ring (49) here supports the sealing effect between the mounting surface (3) and the back side of the actuation assembly (10).

The inlet threaded bore (41), see FIGS. 2 and 3, opens into a radial distribution bore (42). This distribution bore (42) is closed outwardly by a clamping sleeve (53). A compression ball (54) is morticed into the bore of the clamping sleeve (53), which compression ball permanently fixes the clamping sleeve (53) in the individual radial distribution bore (42) in an oil- or gas-tight manner. The radial distribution bore (42), for example, meets perpendicular to an axial distribution bore (43), which opens into the pressure chamber (37, 38). The axial distribution bore (43) is sealed closed to the mounting surface (3) with a compression ball.

The distribution bores (42, 43) here have a diameter of 3 mm. The hydraulic oil flowing in via the hydraulic adapter (56), for example, an oil of the type HLP 46 according to DIN 51524, Part 2, which has a viscosity of 46±2 $mm^2/s$ at 40° Celsius, quickly distributes itself in the pressure chamber (37, 38).

According to FIG. 2, at least one sealing plug threaded bore (52) is also located in the mounting zone (13), which bore also opens into a vertical bore (42) and from there is connected to the pressure chamber (37, 38) via an axial distribution bore (43). These distribution bores are closed outwardly in the same way as the distribution bores of the inlet.

The two bending plates (15, 16) formed on the mounting zone (13) represent the elastic bending zone (21). The elastically deformable bending plates (15, 16) situated on both sides of the gap (37, 38) taper from the outside in the direction of the central center line (9). Their wall thickness decreases in the embodiment from, for example, 9 to 6.2 mm. The form stiffness of the bending plates (15, 16) thus decreases almost steadily in the direction of the clamping zone (22). The transitions between the zones (13) and (21) are rounded, for example, with large radii. The bending zone (21) is withdrawn in relation to the mounting zone (13) in order not to bring the deformation of the bending zone (21) into the installation joint located between the main body (1) and the mounting zone (13).

Towards the respective shaft-coupling assembly (60) the bending plates (15, 16) of the bending zone (21) transition into the two clamping zones (22), which represent the circumferential tong jaws (23, 29). In the right bending plate (15) according to FIGS. 2 and 3, the tong jaw (29) is also a part of the bending plate (15). However, the tong jaw (29) is spatially offset from the bending zone (21) by a, for example, 1.5 mm deep and, for example, 2.3 mm wide axial groove (17).

The tong jaw (29) has a planar friction surface (32) within the axial groove (17). The friction surface (32) has an average radius of 142.3 mm in the exemplary embodiment. The maximum width of the friction surface (32) is, for example, 6 mm in the clamping zone (22).

The bending plate (16) is, for example, 6.2 mm shorter than the bending plate (15) in the radial direction. In addition, it ends in an internal thread (18) in the direction of the shaft (5). According to FIG. 3, the internal thread (18) is limited by a planar stop surface (19) in the direction of the mounting surface (3), which stop surface is separated in relation to the bending plate (16) by a circumferential notch. The stop surface (19) extends parallel to the mounting surface (3). It is set back so far in relation to the radial outer wall of the bending plate (16) that the internal thread (18) has a length of 6 mm.

A screw ring sits as tong jaw (23) on the bending plate (16). The latter is a short tubular or annular body which comprises an external thread (24) and a stop flange (26) towards the bending plate (16). In addition, a collar ring (25) is formed on the screw ring (23), which collar ring protrudes in the assembled state of the tong jaw (23) in the axial groove (17) of the bending plate (15), for example, with clearance on all sides. At least an axial clearance of at least 0.1 mm is required between the bottom of the axial groove (17) and the free end face end of the collar ring (25). If very high oil pressures are used, it may be necessary for the bore wall of the collar ring (25) to lie against the inner groove wall of the axial groove (17). The inner groove wall is the groove wall having the smaller diameter.

The end face of the tong jaw (23) oriented toward the gap (37) forms a planar friction surface (31) within the collar ring (25). The dimensions of the friction surface (31) correspond to those of the friction surface (32).

The screw ring or tong jaw (23) without the stop flange (26) has a radial extension of, for example, 6.7 mm at a length of, for example, 13.8 mm. The stop flange (26) protrudes towards the bending plate (16) by, for example, 2.2 mm. Its strength is, for example, 2.2 mm. The axially projecting collar ring (25) protrudes 5.6 mm over the friction surface (31). The wall thickness of the collar ring (25) formed on the tong jaw (23) is, for example, 2.2 mm. The radially outer wall of the collar ring (25) is equipped at the free end with a 15-degree chamfer.

According to FIG. 2, the tong jaw (23) comprises several tool recesses (28) in the form of bores in its left end face. Via the latter, the tong jaw (23), after assembly of the sealing ring (50), is screwed into the internal thread (18) of the bending plate (16) by means of a pin wrench or face spanner. The screwing process is completed when the stop flange (26) lies firmly against the stop surface (19) of the bending plate (16).

The tong jaw (23) is secured to the bending plate (16) of the gap housing (11), if necessary, by an adhesive. For this, the adhesive is applied to the internal thread (18) and/or the external thread (24), before screwing the tong jaw (23) into the bending plate (16). This adhesive securing can also be applied, among other things, to the tong jaw (23) of FIGS. 6 and 7.

The friction surfaces (31, 32) of both tong jaws (23, 29) have inwardly directed surface normals (33). The latter point in the direction of the center plane (7) according to FIG. 6. Instead of the planar friction surfaces (31, 32), which are also oriented parallel to the assembly joint (16), the friction surfaces can also have the shape of a truncated cone sheathe or a partial region of a torus.

Figure 6:
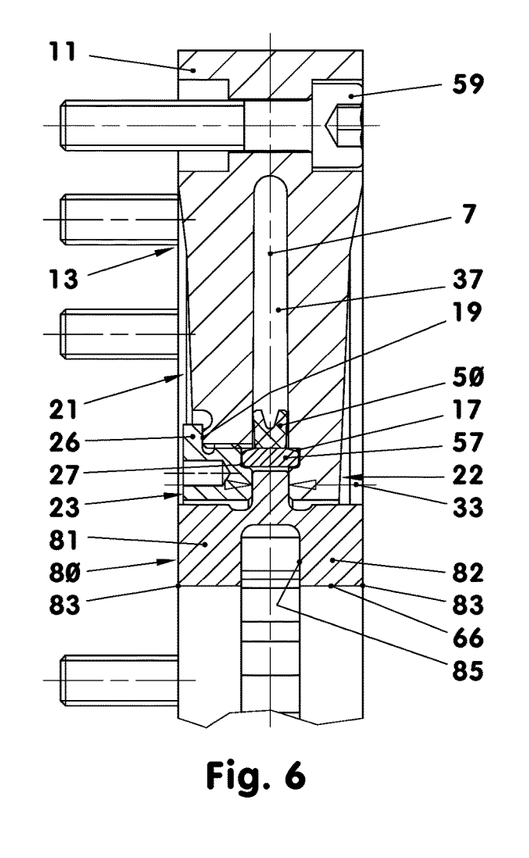
FIG. 6 is a partial longitudinal section of the braking and/or clamping device having a supported support ring.
Figure 7:
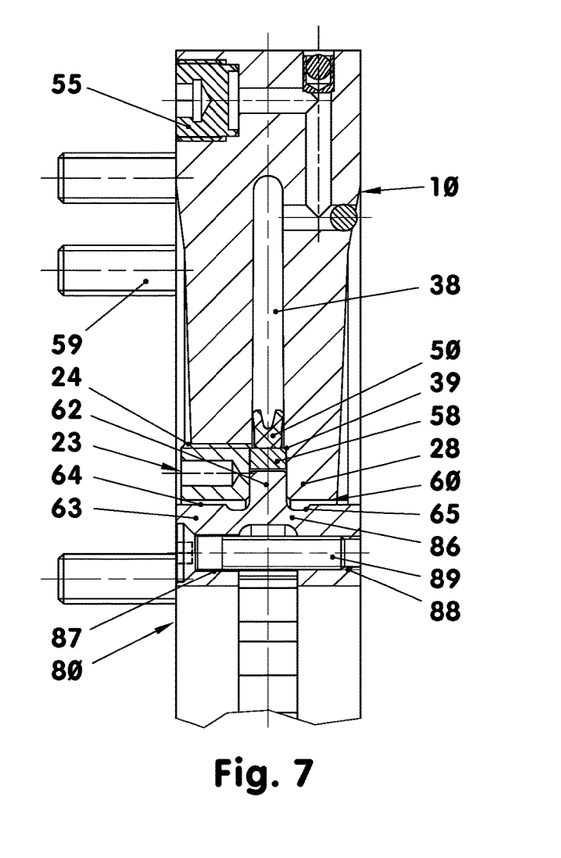
FIG. 7 is a partial longitudinal section of the braking and/or clamping device having a non-supported support ring.

The tong jaws (23, 29) of the actuation assembly (10), with clamped braking and/or clamping device, lie against a clamping flange (62) of the clutch region (61) of a shaft-coupling assembly (60), see FIGS. 2, 6 and 7.

The gap or pressure chamber (37, 38) is closed by a double lip seal (50) radially toward the center line (9). The double lip seal (50) made of, for example, a polyurethane having a Shore D hardness of 57 has two radially outwardly oriented sealing lips (51), which are each applied to the side walls of the pressure chamber (37) due to its own elasticity and/or additionally by the internal pressure in the pressure chamber (37). The bore wall of the double lip seal (50) lies against the smooth radial outer wall of the collar ring (25).

According to FIG. 6, the tong jaw (23) has a recess (27) instead of a formed collar ring (25). The collar ring (25), on which the sealing ring (50) is radially supported according to FIG. 3, is replaced by a wide support ring (57), which, according to FIG. 6, is embraced on the left side by the recess (27) and the internal thread (18) and on the right side by the axial groove (17), possibly with clearance on all sides. After installation of the sealing ring (50), the support ring (57) is pushed under the sealing ring (50) and then the tong jaw (23) is screwed in.

In FIG. 7, the axial groove (17) and the recess (27) are dispensed with in the region of the tong jaws (23, 29). In addition, the wide support ring (57) is replaced by a narrow support ring (58). In this context, the gap (38) is shaped narrower radially outwardly of the narrow support ring (58) to allow a gap space broadening (39) to arise on both sides in the region of the seat of the support ring (58). The bottom of the gap space broadening (39), a right and left narrow strip, has a diameter which corresponds to the minimum diameter of the internal thread (18). The support ring (58), at least when the pressure of the pressure chamber (38) is relieved, lies with a small clearance against the bottom of the gap space broadening (39).

The end face of the tong jaw (23) oriented toward the gap (38) is a planar surface here.

In the solution variants according to FIGS. 6 and 7, the inner diameter of the support rings (57, 58) and/or their enclosures are always chosen so large that they do not contact the rotating parts of the shaft (5) with open braking and/or clamping device.

FIGS. 1 and 3 to 5 show four different shaft-coupling assemblies (80, 90, 100, 110). FIG. 3 shows a coupling assembly having an axial assembly flange (110) as a shaft-coupling assembly. In this variant, the clutch region (61) consists of a flange core (63). The flange core (63) is an annular body, which carries radially outward, for example, the centrally formed clamping flange (62). The, for example, 4.4 mm wide clamping flange (62) projects radially, for example by 4 mm, from the flange core (63) as a circumferential web. Its end faces form, for example, flat friction surfaces (71, 72). The latter are usually, like the friction surfaces (31, 32) of the tong jaws (23, 29), finely machined. The friction surfaces (71, 72) have outwardly directed surface normals (73).

Alternatively, the friction surfaces (31, 32) or the friction surfaces (71, 72) can have a surface structure. For example, this is created by sandblasting or by a diamond or sapphire coating. Such coatings have a layer thickness of, for example, 0.038 mm. The average grain size of the coating base material is 30 μm at this layer thickness.

The clamping flange (62) transitions into the flange core (63) on both sides via relief notches (65), see FIG. 7. The relief notches (65) are 2.8 mm wide, 0.65 mm deep and each have 1 mm radii on both sides.

The flange core (63) according to FIG. 3 has, to form an axial assembly flange (111), a central stepped bore (112) which carries a radial seat surface (113) and a planar collar surface (114) on the flange collar side. In the region of the axial assembly flange (111) are several bores (115) having cylinder counterbores parallel to the center line (9). Screws (119) are arranged in these bores (115), via which the coupling assembly (110) is screwed directly to the shaft (5) at the shaft collar (6).

If necessary, the clamping flange (62) can also comprise transverse grooves which extend as far as the flange base (64). In this way, instead of a completely circumferential clamping flange (62), several or many clamping webs extend radially from the flange core (63) in order to protrude between the tong jaws (23, 29). The clamping webs, in this case, can, to influence the device noise, extend with constant or irregular pitch from the flange core (63).

FIGS. 1, 2, 6 and 7 show a shaft-coupling assembly (80) having a double radial clamping flange. Here, the flange core (63) has a central cylindrical bore (66) into which a groove (85) is incorporated centrally, which has a rectangular cross-section, for example. Thus, two clamping flanges (81, 82) are created to produce a clamping mechanism (76) in the shaft-coupling region (75). The groove width is, for example, 7 mm with a groove depth of, for example, 7.35 mm. The groove (85) has two radii of curvature of 1.5 mm. Between the individual relief notch (65) and the nearest groove rounding is a material web (86) of 1.5 to 2 mm. The flange core (63) is bored through in the region of the clamping flanges (81, 82) so that, according to FIGS. 2 and 7, many bores (87) with conical countersinking in pairs are located right of the groove and correspondingly many threaded bores (88), for example, M4, to the left of the groove (85). 48 screws (89) are used in the exemplary embodiment.

Possibly, the clamping surface (66), the inner diameter of which is here, for example, 260 mm, is equipped with a diamond or sapphire coating, see possibly existing coating of the friction surfaces (31, 32) or (71, 72). Instead of the adherent coating, a diamond paste for improving the adhesion can also be introduced into the assembly joint between the clamping surface (66) and the shaft surface. Alternatively, the clamping surface (66) and/or the shaft surface in the seating region of the flange core (63) may have a frictional structure, which is, for example, lasered.

If, after pushing the device onto the shaft (5) to the intended installation location, the screws (89) are screwed tight, then the clamping flanges (81, 82) are pulled against each other. As a result, due to the articulated resilience of the material webs (86) of the flange core (63), the clamping flanges (81, 82) are firmly applied via the support edges (83), primarily under radial tension.

Figure 4:
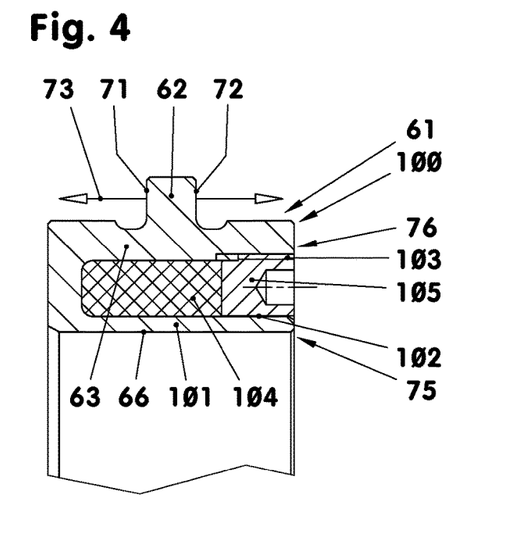
FIG. 4 is an enlarged partial longitudinal section through a shaft-hub connection having displacement clamping sleeve.

An alternative shaft-coupling assembly (60) is shown in FIG. 4. It shows a coupling assembly (100) with displacement clamping sleeve. Here, the flange core (63) comprises a circumferential end face groove (102) as a shaft-coupling region (75), which groove, according to FIG. 4, is incorporated into the flange core (63) from the right-hand end face. For example, a fine thread (103) is cut 7 mm deep in the outer wall of the end face groove (102). An elastic, for example, 1.4 mm thick clamping sleeve wall (101) of the displacement clamping sleeve remains standing toward the shaft (5) or to the bore (66).

An annular elastomeric body (104) is used as a displacement body in the front groove (102). Its width covers 55 to 70% of the flange core width. Its wall thickness measures, for example, 5 mm. To produce a clamping tensioning mechanism (76), a threaded ring (105), for example, by means of a pin wrench, is screwed into the internal thread (103) during assembly of the coupling assembly (100) onto the shaft (5). The elastomeric body (104) is compressed in such a way that the clamping sleeve wall (101) fits snugly and unable to rotate against the shaft (5).

The elastomeric body (104) is made of, for example, acrylonitrile-butadiene rubber NBR. Its hardness in Shore A is between 64 and 68.

Figure 5:
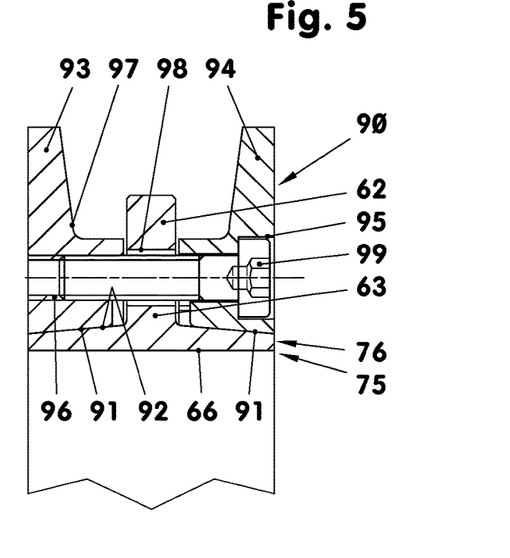
FIG. 5 is an enlarged partial longitudinal section through a shaft-hub connection having ring spring clamping set.

FIG. 5 shows a partial section of a shaft-coupling assembly (90) having a shrink disk connection. Here, the flange core (63) is a relatively thin ring that tapers outwardly in diameter on both sides. To the right and left of the central clamping flange (62), it has two truncated cone sheathes (91) as a radially outer wall. The central clamping flange (62) protrudes approximately 11.5 mm in the radial direction over the truncated cone sheathes (91).

On both sides of the truncated cone sheaths (91) sit ring taper clamping elements (93, 94) in order to form, together with the flange core (63), a shrink disk serving as a clamping mechanism. The ring taper clamping elements (93, 94) are rings, the central cavities (92) of which are conically shaped to match the truncated cone sheathes (91). The cone angle is, for example 5 degrees. In order to leave room for the tong jaws (23, 29) of the actuation assembly (10), the ring taper clamping elements (93, 94) are each provided at the end faces, which are oriented towards the clamping flange (62), with recesses (97) which are, for example, about 4.3 mm wide at the narrowest point and 10 mm deep. The width of the recesses (97) increases steadily with increasing radius.

Both ring taper clamping elements (93, 94) carry coaxial bores (95, 96) for the screws (99), with which the ring taper clamping elements (93, 94) are pressed against the thin-walled flange core (63) under axial and radial tension. The left ring taper clamping element (93) according to FIG. 5 comprises a threaded bore (96) for this purpose, while the right ring taper clamping element (94) is provided with a bore (95) having cylinder counterbore. The shrink disk has, for example, 24 screws (99). All screws also traverse the clamping flange (62) between the friction surfaces (31, 32) and the flange core (63), which comprises a bore (98) concentric to the bores (95, 96).

This braking and/or clamping device is supplied in combination with the selected shaft-coupling assembly (80, 90, 100, 110). The respective shaft-coupling assembly (80, 90, 100, 110) is seated coaxially in the actuation assembly (10) in this case. For assembly in the machine receiving the device, the shaft-coupling assembly (80, 90, 100) is pushed onto the shaft (5) and fastened there, usually releasably, directly on the mounting surface (3) of the main body (1).

Finally, the fastening screws (59) are inserted into the corresponding main body-side bores and screwed there.

If there is no hydraulic oil operating pressure in the pressure chamber (37), then the shaft (5) is clamped in relation to the main body (1). The pressure chamber (37) has no appreciable oil pressure, since the oil supply is relieved of pressure via a valve, not shown, in the oil tank. The bending plates (15, 16) rest biased against the clamping flange (62) via their tong jaws (23, 29), see FIG. 2. The bias results from the spring rate of pre-deformed bending plates (15, 16). The amount of the spring rate is a function of the ring disk-side material selection and the geometry of the bending zone (21). The generated braking or holding torque is 3000±200 Nm.

The bending plates (15, 16) would only assume the fully relaxed state if no clamping flange (62) were between the tong jaws (23, 29). Then, in the exemplary embodiment, the pressure chamber (37, 38) would be a gap having a constant gap width.

In order to release the braking and/or clamping device, for example, via the hydraulic adapter (56), see FIG. 3, the oil pressure in the pressure chamber (37, 38) is increased to, for example, 100 to $150*10^5$ Pa. From the hydraulic adapter (56), the pressure increase propagates via the distribution bores (42) and (43) into the pressure chamber (37, 38). The bending plates (15, 16) deform in the elastic bending zones (21), see FIG. 3. In this case, each clamping zone (22) moves in relation to the fixed mounting zone (13), substantially in the axially outward direction. The tong jaws (23, 29) lift from the clamping flange (62) in the direction of the arrows (47). The friction surfaces (31, 32) on the actuation assembly side move away from the friction surfaces (71, 72) on the shaft-coupling assembly side so that contact no longer exists between the shaft (5) and the main body (1). The clearance per friction surface pairing (31) to (71) and (32) to (72), that is, the distance between the previously contacting friction surfaces, is now between 0.3 and 0.5 mm. The device is designed for 5 to 10 million opening and closing cycles.

LIST OF REFERENCE NUMBERS 1 main body
2 centering, external centering
3 mounting surface of (1)
4 bore, central of (10)
5 shaft
6 shaft collar
7 center plane
8 fictitious axis, vertical 9 center line of the device, central
10 actuation assembly
11 gap housing, deformable in some regions
12 front side
13 mounting zone
14 outer wall, end wall
15 bending plate, outside, large
16 bending plate, inside, small
17 axial groove in (15)
18 internal thread, fine thread
19 stop surface, planar
21 bending zone, deformable, elastic
22 clamping zones
23 tong jaws, screwed on, screw ring
24 external thread
25 collar ring
26 stop flange
27 recess
28 tool recess
29 tong jaws, formed
31,32 friction surfaces
33 surface normals of (31, 32)
37 pressure chamber; gap; groove, wide
38 pressure chamber; gap; groove, narrow
39 gap space broadening
41 inlet threaded bores
42 distribution bore, radial
43 distribution bore, axial
45 bores with countersinks, through holes, fastening bores
47 arrows, direction of movement
48 hydraulic oil inlet
49 cutting ring
50 double lip seal, sealing ring
51 sealing lips
52 sealing plug threaded bore
53 clamping sleeve
54 compression ball
55 sealing plug
56 hydraulic adapter
57 support ring wide, for (50)
58 support ring narrow, for (50)
59 fastening screws
60 shaft-coupling assembly
61 clutch region
62 clamping flange, central
63 flange core
64 flange base
65 relief notches
66 bore, central; clamping surface of (60)
71, 72 friction surfaces
73 surface normals of (71, 72)
75 shaft-coupling region
76 clamping mechanism
80 shaft-coupling assembly with double radial clamping flange
81,82 clamping flange radial, left, right
83 support edges
85 groove
86 material web
87 bore with conical countersink
88 threaded bore
89 screw, cylinder head screw
90 shaft-coupling assembly with shrink disk connection
91 truncated cone sheathes, outer walls, radial; cones
92 cavity, central
93,94 ring taper clamping elements
95 bore with countersink
96 threaded bore
97 recess
98 bore in (62)
99 screws
100 shaft-coupling assembly with displacement clamping sleeve
101 clamping sleeve wall
102 end face groove, cavity for (104) and (105)
103 internal thread, fine thread
104 elastomer body, rubber body, displacement body
105 threaded ring
110 shaft-coupling assembly with axial assembly flange
111 axial assembly flange
112 stepped bore
113 seat surface, radial
114 collar surface, planar
115 bores for (119)
119 screws

The invention claimed is:

1. A braking and/or clamping device for a shaft guided in relation to a main body, comprising
an actuation assembly and
a shaft-coupling assembly,
wherein the actuation assembly comprises a gap housing, which has a mounting zone and
a bending zone which is elastically deformable in some regions with two bending plates separated by a gap,
wherein the bending plates each comprise in two opposing clamping zones tong jaws having friction surfaces, respective surface normals of which are directed inwards,
wherein a sealed pressure chamber, which can be filled with a pressure medium for elastically pushing apart the friction surfaces, is arranged between the bending plates,
wherein the shaft-coupling assembly comprises a clutch region which has two friction surfaces spaced apart from each other, respective surface normals of which point outward,
wherein the shaft-coupling assembly comprises a shaft-coupling region,
wherein the shaft-coupling region is arranged either directly or indirectly via a clamping mechanism on the clutch region, and
wherein when the sealed pressure chamber is relieved of pressure, the friction surfaces of the actuation assembly can be applied to the friction surfaces of the shaft-coupling assembly, thereby producing a braking and/or clamping force.

2. The braking and/or clamping device according to claim 1, wherein at least one tong jaw is a screw ring which can be screwed to the respective bending plate.

3. The braking and/or clamping device according to claim 2, wherein an adhesive integrally connecting the bending plate and the tong jaw is arranged in an assembly joint located between the bending plate and the tong jaw.

4. The braking and/or clamping device according to claim 2, wherein at least one tong jaw comprises an axially projecting collar ring.

5. The braking and/or clamping device according to claim 1,
wherein the sealed pressure chamber is limited in axial direction by the bending plates and in radial direction by at least one sealing ring, and
wherein the at least one sealing ring is a double lip seal ring, two sealing lips of which are oriented radially outward.

6. The braking and/or clamping device according to claim 1, wherein the shaft-coupling assembly has a flange core having a formed or attached clamping flange.

7. The braking and/or clamping device according to claim 6, wherein the shaft-coupling region of the shaft-coupling assembly comprises two ring taper clamping elements that can be tensioned against opposing cones of the flange core.

8. The braking and/or clamping device according to claim 1, wherein the shaft-coupling region of the shaft-coupling assembly radially abuts the shaft.

9. The braking and/or clamping device according to claim 1, wherein the shaft-coupling region of the shaft-coupling assembly comprises two clamping flanges that can be tensioned against each other.

10. The braking and/or clamping device according to claim 1, wherein the shaft-coupling region of the shaft-coupling assembly comprises a volume-reducible cavity in which an elastomeric body is arranged enclosed as a displacement body.

* * * * *